United States Patent
Beg

(10) Patent No.: US 9,941,738 B2
(45) Date of Patent: Apr. 10, 2018

(54) DYNAMIC DC LINK VOLTAGE CONTROL

(71) Applicant: SCHNEIDER ELECTRIC IT CORPORATION, West Kingston, RI (US)

(72) Inventor: Mirza Akmal Beg, Pepperell, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 147 days.

(21) Appl. No.: 15/107,240

(22) PCT Filed: Dec. 23, 2013

(86) PCT No.: PCT/US2013/077535
§ 371 (c)(1),
(2) Date: Jun. 22, 2016

(87) PCT Pub. No.: WO2015/099667
PCT Pub. Date: Jul. 2, 2015

(65) Prior Publication Data
US 2017/0018960 A1  Jan. 19, 2017

(51) Int. Cl.
*H02J 9/06*  (2006.01)
*H02J 7/00*  (2006.01)

(52) U.S. Cl.
CPC ............ *H02J 9/062* (2013.01); *H02J 7/0068* (2013.01)

(58) Field of Classification Search
CPC .............................. H02J 7/0068; H02J 9/062
See application file for complete search history.

(56) References Cited

U.S. PATENT DOCUMENTS

| | | |
|---|---|---|
| 5,315,533 A | 5/1994 | Stich et al. |
| 2010/0133904 A1 | 6/2010 | Klodowski et al. |
| 2011/0134672 A1 | 6/2011 | Sato et al. |
| 2011/0148195 A1 | 6/2011 | Lee |
| 2011/0181108 A1 | 7/2011 | Cohen et al. |

(Continued)

FOREIGN PATENT DOCUMENTS

CN        201032693 Y      3/2008

OTHER PUBLICATIONS

Extended European Search Report from corresponding European Application No. 13900112.7 dated Aug. 1, 2017.

(Continued)

*Primary Examiner* — Robert Deberadinis
(74) *Attorney, Agent, or Firm* — Lando & Anastasi, LLP

(57) ABSTRACT

According to one aspect, embodiments of the invention provide a UPS system comprising an input configured to receive input AC power, an output configured to provide output AC power to a load, a converter coupled to the input and configured to convert the input AC power into DC power, a DC bus configured to receive the DC power, an inverter configured to convert the DC power from the DC bus into output AC power and provide the output AC Power to the output, and a controller configured to receive an output AC output voltage level selection from a user, operate the inverter to generate the output AC power having an AC voltage level based on the output AC output voltage level selection, and operate the converter to generate the DC power having a DC voltage level based on the output AC output voltage level selection.

20 Claims, 2 Drawing Sheets

(56) References Cited

U.S. PATENT DOCUMENTS

2012/0068541 A1 3/2012 Anderson
2012/0153721 A1 6/2012 Feddersen
2012/0306274 A1* 12/2012 Shetler, Jr. .............. H02J 9/062
  307/64

OTHER PUBLICATIONS

Notification of Transmittal of the International Search Report and the Written Opinion of the International Searching Authority from corresponding PCT/US2013/077535 dated Apr. 23, 2014.

* cited by examiner

DYNAMIC DC LINK VOLTAGE CONTROL

CROSS-REFERENCE TO RELATED APPLICATIONS

This application is a U.S. National Stage Application under 35 U.S.C. § 371 of International Application No. PCT/US2013/077535, filed Dec. 23, 2013, titled DYNAMIC DC LINK VOLTAGE CONTROL, which is hereby incorporated herein by reference in its entirety.

BACKGROUND OF INVENTION

1. Field of Invention

The present invention relates generally to systems and methods for controlling an uninterruptible power supply (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs.

SUMMARY OF INVENTION

At least one aspect of the invention is directed to an Uninterruptible Power Supply (UPS) system, the UPS system comprising an input configured to receive input AC power, an output configured to provide output AC power to a load, a converter coupled to the input and configured to convert the input AC power into DC power, a DC bus coupled to the converter and configured to receive the DC power, an inverter coupled to the DC bus and configured to convert the DC power from the DC bus into output AC power and provide the output AC Power to the output, and a controller configured to receive an output AC output voltage level selection from a user, operate the inverter to generate the output AC power having an AC voltage level based on the output AC output voltage level selection, and operate the converter to generate the DC power having a DC voltage level based on the output AC output voltage level selection.

According to one embodiment, in operating the converter to generate the DC power, the controller is further configured to operate the converter to maintain an amplitude modulation ratio between the DC voltage level and the AC Voltage level for different AC output voltage selection values.

According to another embodiment, the controller includes a reference signal generator configured to generate a DC Bus reference signal based on the output AC output voltage level selection from the user. In one embodiment, the reference signal generator includes a digital processor. In another embodiment, the UPS system further comprises a feedback controller coupled to the DC bus and configured to monitor a DC bus voltage level of the DC bus and generate a DC bus voltage level signal based on the DC bus voltage level. In one embodiment, the UPS system further comprises a voltage regulator coupled to the feedback controller, the reference signal generator, and the converter, the voltage regulator configured to operate the converter to generate the DC bus voltage level on the DC bus based on a difference between the DC Bus reference signal and the DC bus voltage level signal.

According to one embodiment, the controller includes an interface configured to receive the output AC output voltage level selection from the user. In one embodiment, the interface includes a manual switch. In another embodiment, the interface is configured to receive a signal from an external system indicating the output AC output voltage level selection from the user.

Another aspect of the invention is directed to a method for operating a UPS system, the method comprising receiving, at an input of the UPS system, input AC power, receiving a first AC output voltage level selection from a user, converting the input AC power into DC power having a first DC voltage level based on the first AC output voltage level selection, providing the DC power to a DC bus, converting the DC power into AC power having a first AC voltage level based on the first AC output voltage level selection, and providing the AC power to an output of the UPS system.

According to one embodiment, the method further comprises receiving a second AC output voltage level selection from the user, adjusting the DC power to a second DC voltage level based on the second AC output voltage level selection, and adjusting the AC power to a second AC voltage level based on the second AC output voltage level selection.

According to another embodiment, adjusting the DC power to a second DC voltage level includes maintaining an amplitude modulation ratio at a substantially constant value. In one embodiment, converting the input AC power into DC power having a first DC voltage level includes generating a first DC reference signal based on the first DC voltage level. In another embodiment, converting the input AC power into DC power having a first DC voltage level includes monitoring a DC bus voltage level on the DC bus and generating a first DC bus voltage level signal.

According to one embodiment, converting the input AC power into DC power having a first DC voltage level includes converting the input AC power into the DC power having the first DC voltage level based on the difference between the first DC reference signal and the first DC bus voltage level signal. In one embodiment, adjusting the DC power to a second DC voltage level includes generating a second DC reference signal based on the second DC voltage level. In another embodiment, adjusting the DC power to a second DC voltage level includes monitoring a DC bus voltage level on the DC bus and generating a second DC bus voltage level signal. In one embodiment, adjusting the DC power to a second DC voltage level includes converting the input AC power into the DC power having the second DC voltage level based on the difference between the second DC reference signal and the second DC bus voltage level signal.

According to another embodiment, the method further comprises converting backup DC power from a DC source into the DC power having one of the first DC voltage level and the second DC voltage level.

One aspect of the invention is directed to an Uninterruptible Power Supply (UPS) system, the UPS system comprising an input configured to receive input AC power, an output configured to provide output AC power to a load, a converter coupled to the input and configured to convert the input AC power into DC power, a DC bus coupled to the converter and configured to receive the DC power, an inverter coupled to the DC bus and configured to convert the DC power from the DC bus into output AC power and provide the output AC Power to the output, and means for adjusting an AC voltage level of the output AC power while maintaining an amplitude modulation radio of the UPS system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
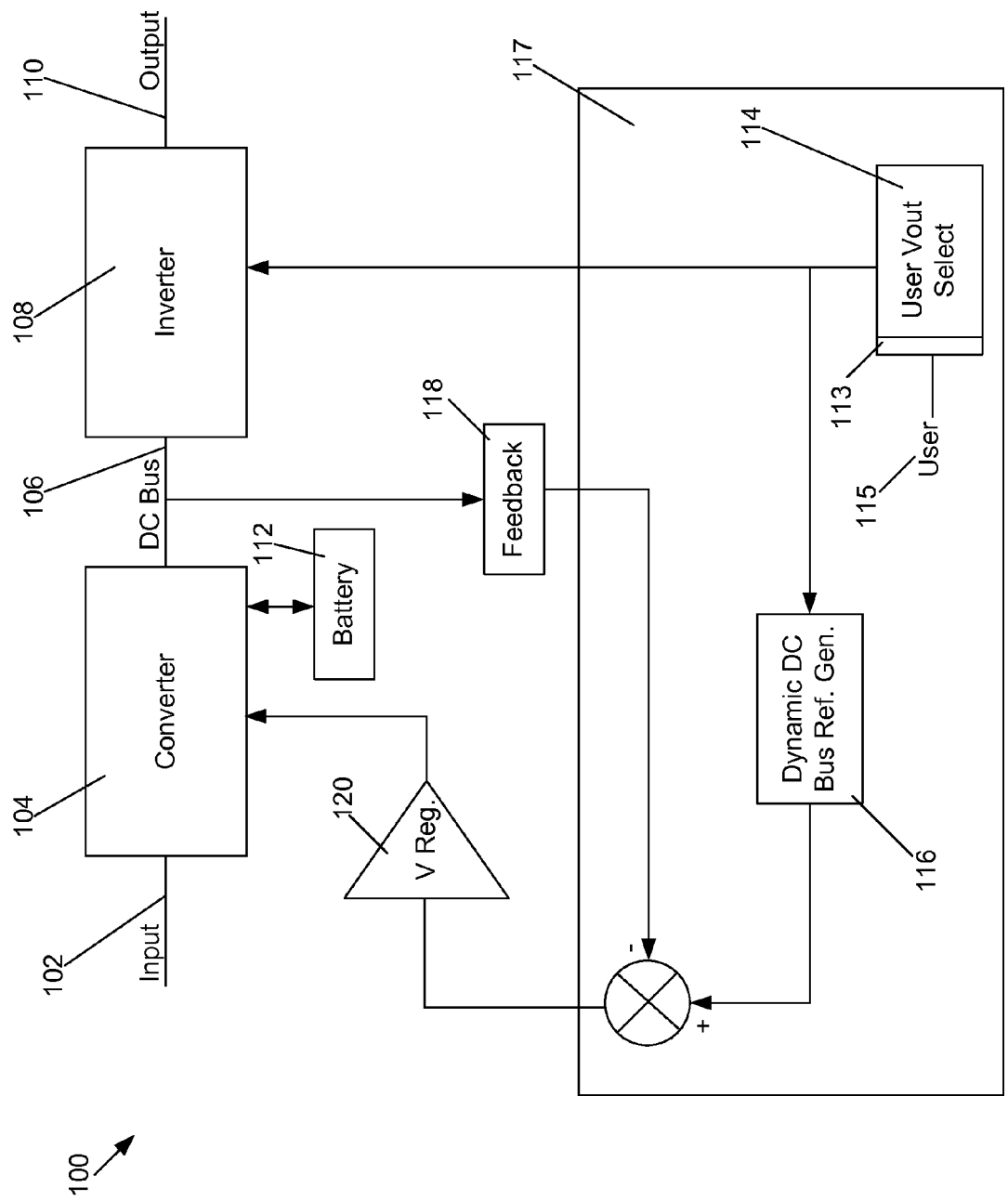
FIG. 1 is a block diagram of a UPS system according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. Some common UPS's allow a user to select an output voltage level of the UPS. For example, in at least one embodiment, the output voltage of a UPS is selectable, by a user, over a range from 208Vrms to 240Vrms. While the selectable voltage output of the UPS may provide greater flexibility to a user, the efficiency of a typical UPS may degrade by as much as two percent if the output voltage is changed from 240Vrms to 208Vrms.

Existing methods for improving the efficiency of a UPS often result in increased cost and/or space requirements. For example, a common approach to improve the efficiency of a UPS includes over-sizing the main power dissipating elements within the UPS (e.g., like magnetic components or switching semiconductor devices). Such an approach adds cost and increases the physical size of the unit.

At least some embodiments described herein provide a system and method for improving the efficiency of a variable output voltage UPS without adding to the cost or space requirements of the UPS.

FIG. 1 is a block diagram of an online UPS 100 according to one aspect of the present invention. The UPS 100 includes an input 102, a converter 104, a DC bus 106, an inverter 108, an output 110, a battery 112, a feedback controller 118, a DC bus voltage regulator 120, and a controller 117. The controller 117 includes an output voltage selection module 114 and a dynamic DC bus reference generator 116.

The input 102 is coupled to the converter 104. The DC bus 106 is coupled between the converter 104 and the inverter 108. The output 110 is coupled to the inverter 108. The feedback controller 118 is coupled to the DC bus 106. The output voltage selection module 114 is coupled to the inverter and the dynamic DC bus reference generator 116. The dynamic DC bus reference generator 116 and the feedback controller 118 are also coupled to the voltage regulator 120. The voltage regulator 120 is also coupled to the converter 104.

The input 102 is configured to be coupled to an AC mains power source. The UPS 100 is configured to operate in different modes of operation based on the status of the AC power provided to the input 102. When AC power provided to the input 102 is acceptable (i.e., above an input power threshold), the UPS 100 operates in a normal mode of operation. In the normal mode of operation, AC power from the input 102 is provided to the converter 104. According to one embodiment, the converter 104 is a Power Factor Correction converter 104; however, in other embodiments, any type of converter 104 may be utilized. The converter 104 converts the AC power into DC power and provides the DC power to the DC bus 106. In one embodiment, DC power is also provided from the converter 104 to the battery to charge the battery 112. In the normal mode of operation, the inverter 108 receives DC power from the DC bus 106, converts the DC power into AC power, and provides AC power to the output 110.

When AC power provided to the input 102 is not acceptable (i.e., below an input power threshold), the UPS 100 operates in a backup mode of operation. In the backup mode of operation, DC power from the battery 112 is regulated by the converter 104 and provided to the DC bus 106. The Inverter 108 receives the DC power from the DC bus 106, converts the DC power into AC power, and provides the AC power to the output 110.

In the normal mode of operation or the backup mode of operation, a user 115 may operate the output voltage selection module 114 to set the output voltage of the UPS 100 to a desired level. For example, if the user 115 operates the output voltage selection module 114 to select an output voltage of 240Vrms, the output voltage selection module 114 operates the inverter 108 to convert the DC power from the DC bus 106 into AC power having the desired voltage level of 240Vrms. According to one embodiment, the output voltage selection module 114 includes an interface 113 that allows a user to select an output voltage of the UPS system 100. In one embodiment, the interface 113 is a manual switch. In another embodiment, the interface 113 is coupled to an external system operated by the user 115 and configured to receive signals from the external system selecting the desired output voltage of the UPS system 100. In still other embodiments, the interface 113 may be part of a Graphical User Interface (GUI) built into the UPS 100.

The output voltage selection module 114 also controls the dynamic DC bus reference generator 116 to generate an appropriate DC reference signal corresponding to a desired DC bus voltage level (e.g., +/−395V) required to produce the 240Vrms voltage (i.e., the selected output voltage of the UPS 100) at the output 110. In one embodiment, the dynamic DC bus reference generator 116 includes a digital processor.

The feedback controller 118 monitors the voltage on the DC bus 106 and generates a DC bus voltage level signal based on the voltage level of the DC bus 106. The difference between the DC reference signal (from the dynamic DC bus reference generator 116) and the DC bus voltage level signal (from the feedback controller 118), calculated by the controller 117, is provided to the DC bus voltage regulator 120. The regulator 120 drives the output of the converter 104 (i.e., the DC bus 106) towards the desired DC bus voltage level (e.g., +/−395V) based on the difference between the DC reference signal and the current DC bus voltage level signal.

The user 115 may operate the output voltage selection module 114 to change the desired output voltage of the UPS 100. For example, in one embodiment, the user 115 may operate the output voltage selection module 114 to change the desired output voltage from 240Vrms to 208Vrms. The output voltage selection module 114 controls the inverter 108 to convert the DC power from the DC bus 106 into AC power having the desired voltage level of 208Vrms.

In a standard variable output UPS system, a change in the desired output voltage of the UPS system does not impact the DC voltage level on a DC bus coupled between a converter and an inverter. For example, some UPS systems are configured to maintain a maximum voltage on the DC bus regardless of the desired output voltage of the UPS system. The maximum DC bus voltage is adequate to maintain a maximum voltage at an output of the UPS system; however, once the output voltage of the UPS system is lowered, the converter continues to generate the same (maximum level) DC voltage on the DC bus. Such a static DC bus voltage may lead to increased inefficiency in the standard UPS system when operating at the low end of a selectable voltage range.

Inefficiency in a UPS system is related to the ratio of the output voltage to the DC bus voltage. This ratio is referred to as the Amplitude Modulation Ratio (Ma), and is expressed in the following equation:

$$Ma = Voutpk/Vbus$$

where:
Voutpk=peak output voltage of the UPS system; and
Vbus=DC voltage of the DC bus 106.

The inverter switching losses in a UPS system are inversely proportional to the Amplitude Modulation Radio. As the Amplitude Modulation ratio decreases, the inverter switching losses increase, resulting in a lower efficiency for the UPS system. For example, in one embodiment, where the desired output voltage of the UPS system is 240Vrms and the corresponding maximum DC bus voltage is +/−395V, the Amplitude Modulation ratio is approximately eighty-six percent. If the desired output voltage of the UPS system is reduced to 208Vrms, but the DC bus voltage is maintained at the maximum level of +/−395V, the Amplitude Modulation ratio drops to approximately seventy-four percent and the switching losses of the inverter are higher, resulting in a lower efficiency UPS system.

In the UPS system 100 illustrated in FIG. 1, not only does the output voltage selection module 114 operate the inverter 108 to convert the DC power from the DC bus 106 into AC power having the voltage level set by the user 115, but it also controls the converter 104 to dynamically adjust the level of voltage on the DC bus 106 based on the output voltage level selected by the user 115.

When the user 115 operates the output voltage selection module 114 to change the desired output voltage of the UPS 100 (e.g., from 240Vrms to 208Vrms), the output voltage selection module 114 controls the dynamic DC bus reference generator 116 to generate an appropriate DC reference signal corresponding to an adjusted DC bus voltage level (e.g., +/−342V) required to produce the adjusted 208Vrms voltage at the output 110.

The feedback controller 118 monitors the voltage on the DC bus 106 and generates a DC bus voltage level signal based on the voltage level of the DC bus 106. The difference between the DC reference signal (from the dynamic DC bus reference generator 116) and the DC bus voltage level signal (from the feedback controller 118) is provided to the DC bus voltage regulator 120. The regulator 120 drives the output of the converter 104 (i.e., the DC bus 106) towards the adjusted DC bus voltage level (e.g., +/−342V) based on the difference between the DC reference signal and the current DC bus voltage level signal.

In driving the DC bus voltage level down to +/−342V for a UPS output voltage of 208Vrms, the amplitude modulation ratio is maintained at approximately eighty-six percent. Hence, the efficiency of the UPS system 100 is also maintained at substantially the same level. Absent adjustment of the DC bus voltage level, the amplitude modulation radio would have been lowered and the efficiency of the UPS system 100 would have increased in response to the lowering of the UPS output voltage.

By dynamically adjusting the DC bus voltage in response to the user selected output voltage level of a UPS system, as described above, efficiency of the UPS system may be maintained simply and cheaply, despite a lowering of the UPS output voltage level.

Figure 2:
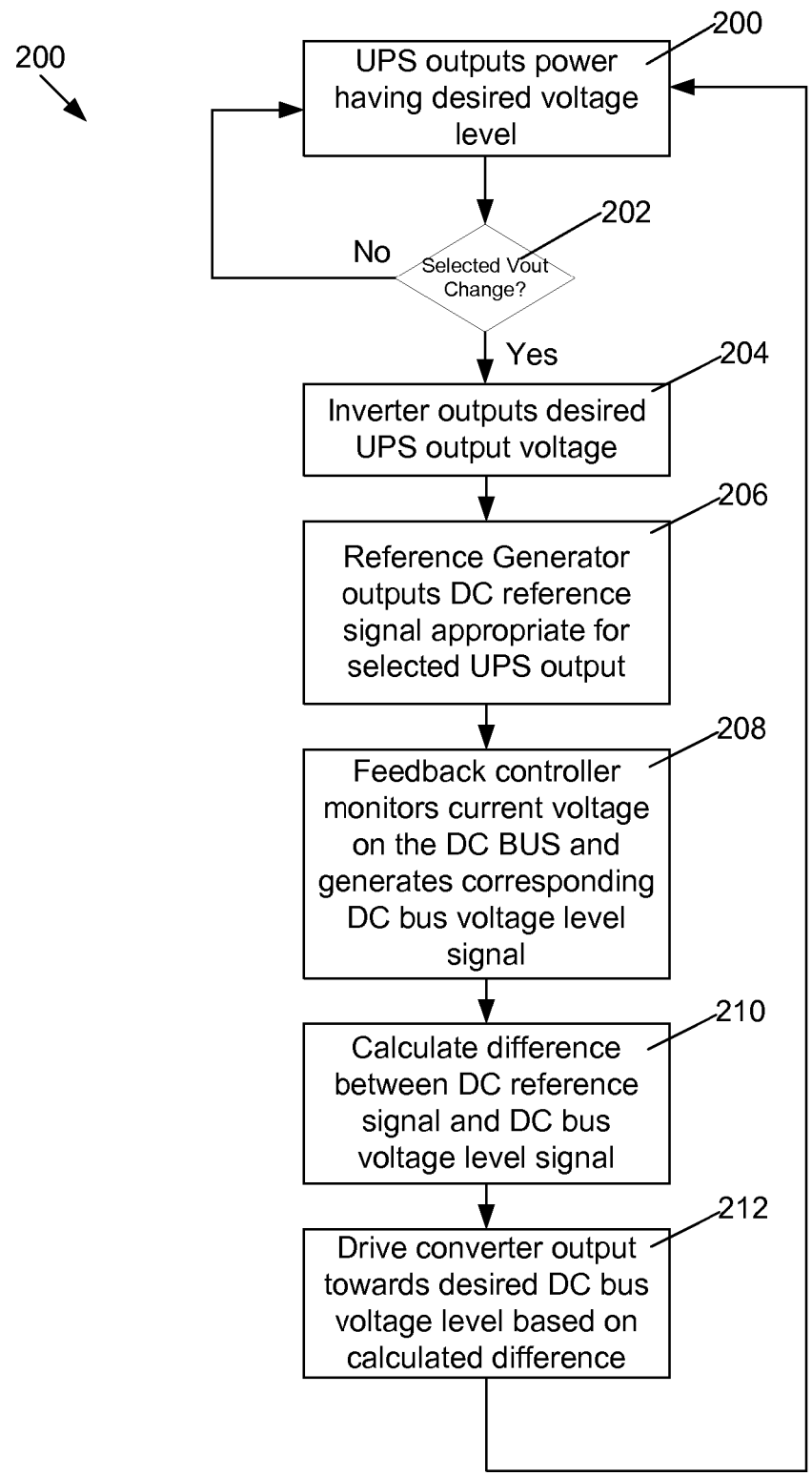
FIG. 2 is a flow chart illustrating a process for operating a UPS system according to one aspect of the present invention.

FIG. 2 is a flow chart illustrating a process 200 for operating the UPS system 100 according to one aspect of the present invention. At block 200, the UPS system 100 is operating in the normal mode or the backup mode and provides power having a desired voltage level (selected by a user 115) to a load coupled to the output 110. At block 202, a determination is made whether the user has changed the desired output voltage level of the UPS system 100. At block 200, in response to a determination that the user 115 has not changed the selected output voltage level of the UPS system, the UPS system 100 continues to provide power having the selected voltage level to the load coupled to the output 110.

At block 204, in response to a determination that the user has changed the desired output voltage level of the UPS system 100 (e.g., at the output voltage selection module 114), the output voltage selection module 114 operates the inverter to convert DC power from the DC bus 106 into AC power having the selected voltage level set by the user 115.

At block 206, the output voltage selection module 114 also controls the dynamic DC bus reference generator 116 to generate an appropriate DC reference signal corresponding to an adjusted DC bus voltage level required to produce the selected voltage level at the output 110. At block 208, the feedback controller 118 monitors the current voltage on the DC bus 106 and generates a DC bus voltage level signal based on the current voltage level of the DC bus 106.

At block 208, the difference between the DC reference signal (from the dynamic DC bus reference generator 116) and the DC bus voltage level signal (from the feedback controller 118) is calculated by the controller 117 and provided to the DC bus voltage regulator 120. At block 212, the voltage regulator 120 drives the output of the converter 104 (i.e., the DC bus 106) towards the adjusted DC bus voltage level based on the difference between the DC reference signal and the current DC bus voltage level signal. At block 200, the UPS system 100 provides power having the desired voltage level (selected by a user 115) to the load coupled to the output 110.

In adjusting the DC bus voltage level based on the UPS output voltage selected by the user 115, the amplitude modulation ratio of the UPS system 100 and hence, the efficiency of the UPS system, may be maintained at substantially the same levels. Absent adjustment of the DC bus voltage level, a reduction in the UPS output voltage may result in decreased efficiency of the UPS system 100.

As described herein, the system and method for improving the efficiency of a variable output voltage UPS is utilized within an online UPS system; however, in other embodiments, the system and method may be utilized with any other type of UPS system or other types of power devices, such as frequency converters.

As described herein, the UPS system 100 receives AC power at the input 102; however, in other embodiments, the UPS system 100 may receive DC power at the input 102 and the converter 104 may regulate the DC power to a level appropriate for the DC bus 106.

As described herein, the output voltage level of the UPS system 100 is shifted between 208Vrms and 240Vrms; however, in other embodiments, the output voltage level of the UPS system 100 may be set to any other appropriate level. As also described herein, the DC bus voltage level is shifted between +/−342V and +/−395V; however, in other embodiments, the DC bus voltage level may be set to any other appropriate level.

At least some embodiments described herein provide a system and method for improving the efficiency of a variable output voltage UPS without adding to the cost or space requirements of the UPS. As described herein, by dynamically adjusting the DC bus voltage in response to the user selected output voltage level of a UPS system, efficiency of the UPS system may be maintained simply and cheaply, regardless of a change in the UPS output voltage level.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system, the UPS system comprising:
   an input configured to receive input AC power;
   an output configured to provide output AC power to a load;
   a converter coupled to the input and configured to convert the input AC power into DC power;
   a DC bus coupled to the converter and configured to receive the DC power;
   an inverter coupled to the DC bus and configured to convert the DC power from the DC bus into output AC power and provide the output AC Power to the output; and
   a controller configured to receive an output AC output voltage level selection from a user, operate the inverter to generate the output AC power having an AC voltage level based on the output AC output voltage level selection, and operate the converter to generate the DC power having a DC voltage level based on the output AC output voltage level selection.

2. The UPS system of claim 1, wherein in operating the converter to generate the DC power, the controller is further configured to operate the converter to maintain an amplitude modulation ratio between the DC voltage level and the AC Voltage level for different AC output voltage selection values.

3. The UPS system of claim 1, wherein the controller includes a reference signal generator configured to generate a DC Bus reference signal based on the output AC output voltage level selection from the user.

4. The UPS system of claim 3, wherein the reference signal generator includes a digital processor.

5. The UPS system of claim 3, further comprising a feedback controller coupled to the DC bus and configured to monitor a DC bus voltage level of the DC bus and generate a DC bus voltage level signal based on the DC bus voltage level.

6. The UPS system of claim 5, further comprising a voltage regulator coupled to the feedback controller, the reference signal generator, and the converter, the voltage regulator configured to operate the converter to generate the DC bus voltage level on the DC bus based on a difference between the DC Bus reference signal and the DC bus voltage level signal.

7. The UPS system of claim 1, wherein the controller includes an interface configured to receive the output AC output voltage level selection from the user.

8. The UPS system of claim 7, wherein the interface includes a manual switch.

9. The UPS system of claim 7, wherein the interface is configured to receive a signal from an external system indicating the output AC output voltage level selection from the user.

10. A method for operating a UPS system, the method comprising:
    receiving, at an input of the UPS system, input AC power;
    receiving a first AC output voltage level selection from a user;
    converting the input AC power into DC power having a first DC voltage level based on the first AC output voltage level selection;
    providing the DC power to a DC bus;
    converting the DC power into AC power having a first AC voltage level based on the first AC output voltage level selection; and
    providing the AC power to an output of the UPS system.

11. The method of claim 10, further comprising:
    receiving a second AC output voltage level selection from the user;
    adjusting the DC power to a second DC voltage level based on the second AC output voltage level selection; and
    adjusting the AC power to a second AC voltage level based on the second AC output voltage level selection.

12. The method of claim 11, wherein adjusting the DC power to a second DC voltage level includes maintaining an amplitude modulation ratio at a substantially constant value.

13. The method of claim 11, wherein converting the input AC power into DC power having a first DC voltage level includes generating a first DC reference signal based on the first DC voltage level.

14. The method of claim 13, wherein converting the input AC power into DC power having a first DC voltage level includes monitoring a DC bus voltage level on the DC bus and generating a first DC bus voltage level signal.

15. The method of claim 14, wherein converting the input AC power into DC power having a first DC voltage level includes converting the input AC power into the DC power having the first DC voltage level based on the difference between the first DC reference signal and the first DC bus voltage level signal.

16. The method of claim 15, wherein adjusting the DC power to a second DC voltage level includes generating a second DC reference signal based on the second DC voltage level.

17. The method of claim 16, wherein adjusting the DC power to a second DC voltage level includes monitoring a DC bus voltage level on the DC bus and generating a second DC bus voltage level signal.

18. The method of claim 17, wherein adjusting the DC power to a second DC voltage level includes converting the input AC power into the DC power having the second DC voltage level based on the difference between the second DC reference signal and the second DC bus voltage level signal.

19. The method of claim 11, further comprising converting backup DC power from a DC source into the DC power having one of the first DC voltage level and the second DC voltage level.

20. An Uninterruptible Power Supply (UPS) system, the UPS system comprising:
    an input configured to receive input AC power;
    an output configured to provide output AC power to a load;
    a converter coupled to the input and configured to convert the input AC power into DC power;
    a DC bus coupled to the converter and configured to receive the DC power;
    an inverter coupled to the DC bus and configured to convert the DC power from the DC bus into output AC power and provide the output AC Power to the output; and
    means for adjusting an AC voltage level of the output AC power while maintaining an amplitude modulation radio of the UPS system.

* * * * *